United States Patent
Novak et al.

(10) Patent No.: US 6,393,531 B1
(45) Date of Patent: May 21, 2002

(54) QUEUE BASED DATA CONTROL MECHANISM FOR QUEUE BASED MEMORY CONTROLLER

(75) Inventors: Stephen T. Novak, South Lake Tahoe; John C. Peck, Jr., Mountain View, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/258,878

(22) Filed: Feb. 25, 1999

Related U.S. Application Data (63) Continuation-in-part of application No. 09/205,665, filed on Dec. 4, 1998.
(51) Int. Cl.$^7$ .............................................. G06F 13/00
(52) U.S. Cl. ...................... 711/154; 711/109; 711/159; 711/165; 365/189.12; 713/600
(58) Field of Search ................................ 711/109, 154, 711/165, 152, 159; 365/189.12; 713/600

(56) References Cited

U.S. PATENT DOCUMENTS 5,625,778 A * 4/1997 Childers et al. ............ 710/107
5,948,081 A * 9/1999 Foster ......................... 710/40
6,128,749 A * 10/2000 McDonnell et al. ........ 713/600

OTHER PUBLICATIONS

Micron Technology, Inc., Synchronous DRAM Data Sheet, 16Mb:×16 SDRAM.
Micron Technology, Inc., Synchronous DRAM Data Sheet, 64Mb:×4, ×8, ×16 SDRAM.
Micron Technology, Inc., Synchronous DRAM Data Sheet, 64Mb:×32 SDRAM.
Micron Technology, Inc., Synchronous DRAM Data Sheet, 128 MEG: ×4, ×8, ×16 SDRAM.
Micron Technology, Inc., Synchronous DRAM Data Sheet, 256Mb:×4, ×8, ×16 SDRAM.

* cited by examiner

*Primary Examiner*—Matthew Kim
*Assistant Examiner*—Jasmine Song
(74) *Attorney, Agent, or Firm*—Eschweiler & Associates, LLC (57) ABSTRACT

A control queue for predicting, tracking and completing memory requests initiated by a memory controller in a computer memory. The control queue is loaded with the cycle by cycle control data necessary to complete the memory request. The control queue shifts its contents from one entry to the next on every clock cycle to the bottom entry of the queue. The control data from the bottom entry is used to generate signals and data to control the operation of the data path for the current clock cycle. The control queue also tracks and provides operational and timing dependency data to the memory controller so that operations can be initiated properly.

7 Claims, 10 Drawing Sheets

Fig. 1

SDRAM Timing Variables

| timing variable | Who is responsible for meeting timing | Value (clock cycles) for CAS=3 | Value (clock cycles) for CAS=2 | description |
|---|---|---|---|---|
| Tcl = Taa = CAS | RWQ | 3 | 2 | CAS latency. This is the fundamental timing number which communicates how many cycles it will take to activate or read data - this variable determines what the rest of the variables will be. Need to support Tcl=4 for buffered SDRAM |
| Trcd | RWQ | 3-2 | 2 | RAS to CAS latency. Delay from activate to rd/wr command |
| Trc | AQ | 8-7 | 5-7 | Bank Cycle Time-minimum time from activation to activation of same bank. Or auto refresh to activation (mode reg set command). |
| Tras | PQ | 5 | 3-5 | Minimum Bank active time-time from activation to pre-charge of same bank. |
| Trp | AQ | 3 | 2 | Pre-charge time-time from pre-charge command to when bank can be activated or (mode register set or refresh) again. |
| Trw | RWQ | 1/3 | 1/3 | My own timing variable-dictates R->W for how many NOP cycles must exist between Rd and WR and when data bus needs to be tristated before the last read data. Not configurable |
| Tprer=(Tcl-1) | PQ | 2 | 1 | Which data counting from the last one that pre-charge can be asserted. For example, Tprer=2 means pre-charge can be asserted coincident with the 2nd to valid data read. Non-configurable - similar to Tdpl below but for reads. |
| Tdpl=Twr | PQ | 2 | 1-2 | Data in to pre-charge-time from last valid write data to assertion of pre-charge. |
| Tdimm | RWQ | 1 | 1 | 1 cycle for DIMM turn-around time for PM. Non configurable. |
| Tdal | AQ | 5 | 3 | Data in to Active/Refresh-last data to activate of same bank - this is a combination of Tprer Tdpl and Tpr - not used in SMC |
| Trrd | AQ | 2 | 2 | Bank to different Bank in same slot Delay time - delay from activating two banks within the same slot. Non-configurable. |
| Tccd | RWQ | 1 | 1 | CAS to CAS delay time-time from asserting 1 command to the next. -not configurable always assumed to be 1 |
| Twl | RWQ | 0 | 0 | Write Latency - not configurable - always assumed to be immediate |
| Tdqw | RWQ | 0 | 0 | DQM Write Mask Latency - not configurable - always assumed to be immediate |
| Tdqz | RWQ | 2 | 2 | DQM Data Disable Latency - not configurable - assumed to be equal to CAS latency |

RWCQ Queues

| Queues | description |
|---|---|
| Vrd | Valid Read - SDRAM read data will be valid when a valid entry reaches VRd[0]. ACK is asserted whenever WRd[1] is asserted - ACK sensitive to Tcl. The queue depth of this queue is based on the burst length and CAS latency. For burst lengths up to 8 quadwords and CAS latency up to 3 cycles, this queue must be 12 entries deep (Including the current cycle entry). |
| NoAck | This bit is set if a kill signal terminates this request early. The queue depth of this queue is 5. |
| FirstRdQW | Control signal to memory requestors that a request's first quadword has been issued. The queue depth os this queue is 5. |
| DQM | By default entries in this queue are asserted to always tristate the data bus when not in use. A read and write must ensure that the DQM field is de-asserted correctly (2 clks before read, same clk for writes). The queue depth of this queue is 9. |
| VWr | Valid Write. SDRAM write data will be valid when a valid entry in this queue reaches VWr[0] - REQ should be asserted whenever this VWr[1] is asserted - to create a REQ signal which is asserted 1 cycle before write data is required by SDRAM. The queue depth of this queue is based on the burst length configured in the SDRAM. For burst lengths up to 8 quadwords, the queue depth must be 8 entries (including the current cycle entry). |
| ID[7:0] | ID for transaction - defines the destination or source needed for data movement. While there must be 1 queue entry for each VRd entry, the top 8 entries in the queue will be identical, therefore this queue has only 5 entries. |
| CS[7:0] | CS for transaction - needed when ECC errors are detected to record which CS the problem occurred in. While there must be 1 queue entry for each VRd entry, the top 8 entries in the queue will be identical, therefore this queue has only 5 entries. |
| Bank[1:0] | Bank for transaction - needed when ECC errors are detected to record which bank the problem occurred in. While there must be 1 queue entry for each VRd entry, the top 8 entries in the queue will be identical, therefore this queue has only 5 entries. |
| ECC | For reads this field forces read data to be routed to the ECC merge buffer. For writes the field merges the data in the merge buffer with the incoming write data (according to incoming byte enables). |

Queue Issue Dependency

| PQ dependency | PQ resolve dependency | AQ dependency | AQ resolve dependency | RWQ dependency | RWQ resolve dependency |
|---|---|---|---|---|---|
| Preceding RWQ entries | Add RWQ placeholder entry which frees this dependency when reach bottom of RWQ | Trc - previous activates | historical Activate count must be satisfied | Trcd | AQ dependency set by request decoder if NxtReq PMc or PMb - Trcd count must be met after AQ is issued. |
| PQ - RWQ want to issue at the same time | RWQ always has higher priority except in the case of <8QW PMc request in which case PQ has higher priority | Trp | historical pre-charge count must be satisfied | RWCQ - Trw, Tdimm, Tdqw, Tdqz, Tcl, | Look at appropriate bits in RWCQ to see whether RWQ is RdyToGo |
| Tras | historical Activate count must be satisfied | Trrd | Automatically met since only 1 activate queue entry | | |
| RWCQ - Tprer, Twr | Look at appropriate bits in RWCQ to see whether PQ is RdyToGo | | | | |
| Correct CS for PMc | MRA provides Pre_CS | | | | |

Fig. 7

RWCQ Dependencies

| NxtReq category | MDP control queue dependencies (must always = 0) | Other dependencies |
| --- | --- | --- |
| PH read | VRd[cl] - For cl=3 the next read request can be asserted after the 4th entry of the REQ is invalid<br><br>VWr_V[0] - read cannot be asserted until last write has finished. | Always bypasses RWQ so RWQ_V[0] = 0 so can immediately assert R/W - should never use RWQ |
| PH write | Vrd[-1] - write cannot be asserted until 1 NOP cycle after read is done. (In future could be 0 if bus contention can be avoided.)<br><br>VWr[0] - write can be issued on the next clock after the last valid write data has been issued. | Always bypasses RWQ so RWQ_V[0]=0 so can immediately assert R/W - should never use RWQ |
| PMb read | VRd[Trcd+cl-Trw] - Activate can be issued Trcd+cl-Trw cycles before last previous data is returned.<br><br>VWr[Trcd-Trw] - Cannot assert read until all writes are done | PQ_conflict - do not accept until Trp delay from last two-if cl=3 or one-if cl=2, issued prefetches has been met(if to same bank). PreBankConflict= (PreBanks(all banks in PQ w/respect to cl) & NxtReqBanks)<br><br>only accept next request if RWQPMb_V=(RWQ_V[0]=0 \| (RWQ_V[0]=1 && RWQ_Len[0]=1QW \| 2QW && RWQ_Cnt[0]>0)) && RWQ_V[1]=0 \| (RWQ_V[1]=1&& RWQ_Len[1]=1QW))) - otherwise sitting needlessly in RWQ. Don't need activate queue if only accept NxtReq if can immediately issue activate |
| PMb write | VRd[Trcd-Trw] - cannot assert write until one NOP cycle after last valid read has been issued.<br><br>VWr[Trcd-Trw] - cannot assert write until one NOP cycle after last valid read has been issued. | PQ_conflict - do not accept until Trp delay from last two issued prefetches has been met.<br><br>only accept next request if RWQPMb_V=(RWQ_V[0]=0 \| (RWQ_V[0]=1 && RWQ_Len[0]=1QW \| 2QW))&& (RWQ_V[1]=0 \| (RWQ_V[1]=1&& RWQ_Len[1]=1QW))) - otherwise sitting needlessly in a queue. |

Fig. 8

| | | |
|---|---|---|
| PMc read | VRd[Trcd+cl-Tdimm]-Need to give enough time for activate, rw and Tdimm turn-around time.<br><br>VWr[Trcd-Tdimm]-Cannot assert read until all writes and Tdimm NOP cycles are done<br><br>for pre-charge/terminate cannot issue until command bus is free(!(VWr[0] & VWr[0]])) and the following condition are true:<br><br>VRd[cl]-soonest can terminate a read.<br><br>VWr[-Twr+1]- a write can be terminated Twr clocks after the last write data. | RWQ_V[0]=0-only accept PMc RWQ is empty - can immediately assert activate - never use AQ<br><br>PQ_conflict - do not accept request until Trp after all pre-charge-all-corresponding to past PMc requests in PQ have been empties. - NoAllPre.<br><br>PQ - do not issue read request until 1 NOP cycle after Pre-charge/terminate finished |
| PMc write | VRd[Trcd-Tdimm] - Need to give enough time for activate and Tdimm turn around time<br><br>VWr[Trcd-Tdimm] - Cannot assert write until all writes are done and Tdimm turn-around time have been met.<br><br>For pre-charge/terminate<br><br>VRd[cl] - soonest can terminate a read.<br><br>VWr[-Twr+1] - a write can be terminated Twr clocks after the last write data. | RWQ_V[0]=0 - only accept PMc if RWQ is empty - can immediately assert activate - never use AQ<br><br>RWQ_PMC[0]=1 - do not accept requested pre-charge/terminate until PMc request is in RWQ[0] and the conditions to the left are met.<br><br>PQ - do not issue read request until 1 NOP cycle after Pre-charge/terminate finished - Even though the RW and Pre of a PMc are independent - the previous request must be terminated so it is simple to just create a dependency between the Read and the pre to ensure correct timing. |
| Pre | VRd[cl] - soonest can terminate a read.<br><br>VWr[-Twr+1] - a write can be terminated Twr clocks after the last write data. | RWQ_conflict - do not accept request if pre-charge is to any banks in the RWQ or if to currently active RW and the conditions to the left are not met. |

Fig. 8 Cont.

RWCQ Signals

| Signal Name | Purpose | Equation |
|---|---|---|
| Ack | To Acknowledge that read data will be broadcast in 2 cycles | VRd[1] |
| Trans_info | ID for read or write data, CS and Bank for ECC error recording, and the need to store or sue the data read merge buffer for ECC read and writes. {Trans_Info}=ID, CS, Bank, ECC | Write AND RWQAccept ? Use incoming Transaction info : VWr[0] ? (Ptr[0] ? Trans_Info1 : Trans_Info0) " (Ptr[1] ? Trans_Info1 : Trans-Info0) |
| Req | Write data is being used this cycle | Write AND RWQAccept OR VWr[0] |
| RWCQ_DQM | Tells MDP whether it needs to force tristate or it needs to use the data's byte enables. | Do not Tristate if write just accepted OR read and CL=2 has been accepted OR DQM[0] and VWr asserted or DQM[2] and VRd asserted. |

Fig. 9

QUEUE BASED DATA CONTROL MECHANISM FOR QUEUE BASED MEMORY CONTROLLER

CROSS REFERENCE TO A RELATED APPLICATION

This application is a continuation-in-part of commonly assigned U.S. application Ser. No. 09/205,665, filed Dec. 4, 1998 for a "QUEUE BASED MEMORY CONTROLLER", herein incorporated by reference.

FIELD OF THE INVENTION

This invention relates to computer systems and more particularly to memory control mechanisms and techniques employed within computer systems. This invention also relates to performance enhancement and optimization of memory control mechanisms for computer systems.

BACKGROUND OF THE INVENTION

A variety of techniques have been developed to increase the overall processing speed of computer systems. While improvements in integrated circuit processing technologies such as sub-micron processing capabilities have made it possible to dramatically increase the speed of the integrated circuitry itself, other developments in the architectures and bus transfer mechanisms of computer systems have also led to improvements in performance. Exemplary developments include the incorporation of cache memory subsystems as well as code pre-fetching mechanisms within computer systems.

In a typical computer system, memory accesses (reads or writes) are actually composed of discrete operations. An exemplary memory access to a dynamic random access memory (DRAM) (or alternatively synchronous DRAM (SDRAM or SynchDRAM) takes place as follows. The CPU determines that it needs to read or write some data to or from the memory. Note that DRAM based memory is organized by chip select (CS), bank and row. The CS signal is a unique signal that activates a particular group of memory chips in the memory for access. The bank and row refers to the physical design/organization of the chips themselves. Any access must be made by selecting a particular CS, bank and row (this combination is also known as a page). Further, DRAM type memory chips provide a row buffer (one per bank) which holds the data currently being accessed. Continuing with the example, the CPU will dispatch a request along with an address to the memory control logic to retrieve the desired data. The memory control logic will convert the address into a physical memory location consisting of a CS, bank, and row and then initiate the memory access as described below.

In order to access a particular row in the memory, if this row is not already active (see below), the bank containing that row must be pre-charged. Effectively, pre-charging raises all of the bit lines (the wires that connect the rows in each bank to the row buffer) to a voltage that represents a logical 1. When the page is activated (or connected to the bit lines), any bits in the page containing logical zeroes cause the respective bit lines to drop to logical zero. This saves time versus initializing the bit lines to logical zero and waiting for the bits in the page representing a logical 1 to charge up the respective bit lines. A pre-charge operation also causes any currently active row, from a previous access to the bank, to be written back to the memory array from the row buffer so that the data is not lost (see below). A CS or bank can be pre-charged in several ways. Pre-charging occurs upon initialization of the memory, whenever there is a refresh to that CS or whenever the memory control logic dispatches a pre-charge operation to that CS or bank. If the bank is not currently pre-charged, the memory control logic will issue a pre-charge operation to the desired CS in order to pre-charge the bit lines of the desired bank (or possibly all the banks) on that CS.

Next, an activate operation is sent to the desired CS and bank along with the row address in order to activate the particular page onto the bit lines and transfer the page of data into the bank's row buffer. Note that, due to the nature of DRAM memory, an activate operation destroys the contents of that row in the memory array in the process of moving those contents to the row buffer. In order to replace the contents back in the memory array and ensure they are not lost, a pre-charge operation (as discussed earlier) is necessary before activating another row into the row buffer. Once the page is in the row buffer, the appropriate read or write operation can be dispatched along with the column address identifying the bits to read or write. These operations initiate the memory request. The memory request is then completed by transferring the data to or from the memory and sending the appropriate feedback to the unit within the computer system that generated the memory request. Note that once a row is activated and in the row buffer, the memory control logic can perform many reads and writes to that row without performing an additional pre-charge or activate operation.

As can be seen from the example, the initiation of an access to the memory can be broken down into the primitive operations of pre-charge, activate and read/write. Once initiated, the data transfer must then be completed to or from the memory. That is, for a read, the data must be taken in from the memory and passed back to the requestor and for a write, the data to be written must be sent to the memory. Further, the unit that generated the memory request must be informed of its completion or provided with the data it requested.

It is well known in the art that state machine logic can be constructed to efficiently decode accesses, dispatch primitive operations, and control the completion of data transfers to optimize the use of the memory. However, the state machine logic needed to perform these operations, track dependencies among operations and dispatch and complete operations in parallel is often complex. This results in a complex design that requires more gates to implement and is harder to understand and verify.

Further, a complex design usually operates slower. Computer logic is typically designed around a clock signal which keeps operations within the computer synchronized. A typical design has logic stages, each stage of which includes input latches, output latches and combinational logic. The input latches are connected to the inputs of the combinational logic. The input latches latch and hold the input signals steady while the combinational logic operates on them. The output latches latch the output of the combinational logic. The input latches and output latches are also connected to the clock signal. The combinational logic consists of logic gates such as NAND or NOR gates arranged and connected to perform a logic function.

On each pulse of the clock signal (each "clock cycle"), the input latches latch the input signals and make them available to the combinational logic and the output latches latch the output of the combinational logic. The logic stage takes advantage of the fact that the circuits that make up the gates of the combinational logic have propagation delays which introduce a delay between the time the input signals are latched and the time that the result of the combinational logic function is computed. The logic stage is designed so that the combinational logic finishes its computation (that all the signals have propagated through) before the next clock pulse hits the output latches. In this way, on each clock pulse/cycle, the inputs to the combinational logic change, and the output latches latch the result of the previous inputs. Since the output latches also form the input latches for the next logic stage, data is thereby moved from one stage of logic to the next.

Notice that the number of gates that can be put in a logic stage between the input and output latches is partly a function of the clock frequency of the computer. A faster clock frequency leaves less time for signals to propagate through the gates. A more complex design may require more gates between the input and output latches necessitating a slower clock. Therefore, the designer must often make a trade off between a fast clock and a complex logic design.

Accordingly there is a need to optimize and enhance the performance of accesses to the memory while simplifying the design of the memory control logic. Further, there is a need to reduce the logical complexity of the memory control logic which will in turn result in a reduction of the gate counts, the design time/cost and the number of design errors. This will further allow for a decrease in the number of gate delays between logic stages which will result in overall faster operation.

SUMMARY OF THE INVENTION

The problems outlined above are solved by an apparatus and method to complete memory requests in a computer memory according to the present invention. In one aspect of the invention, a memory controller is provided which includes a read write control queue for completing memory requests from the memory controller to a computer memory where the read write control queue includes a queue controller coupled to the memory controller and operative to detect when the memory controller initiates a memory request to the memory. The queue controller is also operative to generate memory control data for completing the memory request. The read write control queue also includes at least one queue comprising at least one top portion coupled to the queue controller and operative to receive the generated memory control data for the initiated request. Further, the queues also have a bottom portion coupled to the computer memory and operative to provide the memory control data to control the transfer of data between said memory controller and the computer memory. Between the top and bottom portions is a shift mechanism which is operative to shift the memory control data from the top portion to the bottom portion.

The present invention further contemplates a method for completing at least one data transfer between a memory controller and a computer memory using at least one queue comprising a top portion and a bottom portion. The data transfer comprises at least one transmission of at least one unit of data. This method comprises the steps of: initiating the data transfer in the computer memory; loading the top portion of the queues with control data to control each of transmission; controlling each transmission using the control data from said bottom portion; and shifting the control data from the top portion to the bottom portion after each transmission.

As a result of the present invention, memory accesses are optimized and the performance of the main memory is enhanced. These advantages are achieved while simplifying the design of the memory access control logic and reducing its logical complexity. This, in turn, results in a reduction of the gate counts, the design time/cost and the number of design errors. In addition, the decrease in the number of gate delays between logic stages results in overall faster operation. The present invention also provides an easily adaptable structure that can be used with a variety of memory types.

BRIEF DESCRIPTION OF THE DRAWINGS

FIG. 2 is a timing variable table for the preferred memory of the computer system depicted in FIG. 1.

FIG. 5 is a table detailing the queues within the preferred read write control queue of FIG. 4 along with a description of the queue entries.

FIGS. 8A & 8B are a table detailing next request dependencies for the preferred queue structure of the read write control queue depicted in FIG. 4.

DETAILED DESCRIPTION OF THE PRESENTLY PREFERRED EMBODIMENTS

Figure 1:
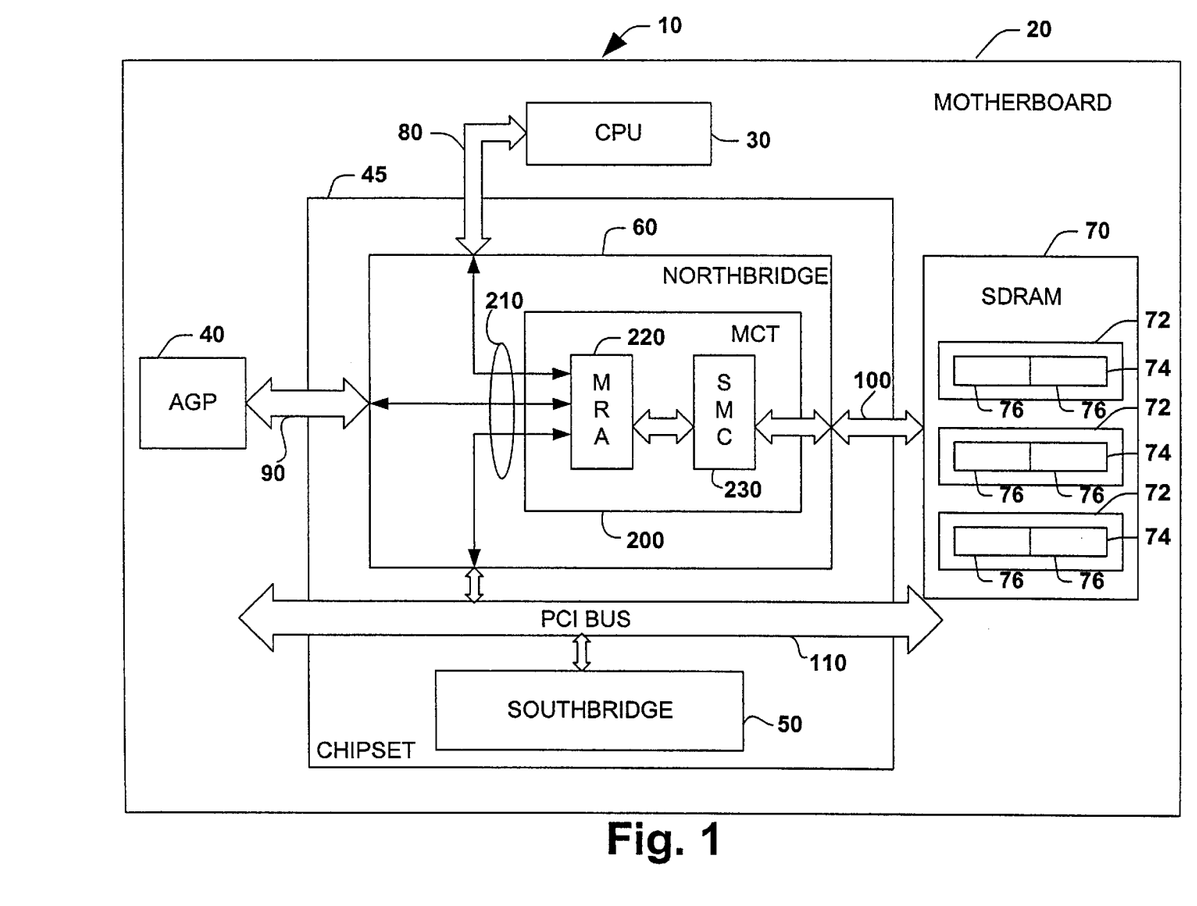
FIG. 1 is a block diagram of an exemplary computer system for use with the memory controller according to the preferred embodiment.

Turning now to the drawings, FIG. 1 shows selected components of an exemplary computer system 10 including a motherboard 20, a central processing unit (CPU) 30, an Advanced Graphics Port (AGP) 40, a chip set 45, a memory 70, a CPU bus 80, an AGP bus 90, a memory bus 100 and a PCI bus 110. It will be appreciated that CPU's 30, busses 90, 100, 110 and motherboards 20 are well known in the art. Further, it will be appreciated that the AGP 40 is but one example of a typical input/output (I/O) device included in the computer system 10, and that the computer system 10 can include a variety of I/O devices which are well known in the art.

The chip set 45 interconnects all of the components of the computer system listed above to each other. In the preferred embodiment, the chip set 45 includes two chips known in the industry as the "Northbridge" 60 and "Southbridge" 50. Alternatively, the chip set 45 can include other chips and the Northbridge 60 and Southbridge 50 can, themselves, include more than one chip. An exemplary Northbridge 60 is the Irongate Northbridge chip manufactured by AMD, Inc. in Sunnyvale, Calif. The exemplary Northbridge 60 is designed to work with a motherboard 20 system bus clock speed of 100 MHZ, however higher clock rates can be used. The Northbridge 60 is designed to interconnect the memory 70 with the other devices in the computer system 10 that need to access the memory 70. Typically, these devices include the CPU 30 and newer technology I/O devices, such as the AGP 40 or I/O devices connected to the PCI bus 110, including the Southbridge 50. These devices are also known as memory requesters 210 and they make memory requests to the Northbridge 60 which then executes and completes these requests to the memory 70 (discussed in more detail below). The Southbridge 50 is usually designed to provide legacy compatibility with older technology I/O and interfaces these devices to the PCI bus 110. The exemplary Northbridge 60 is designed to connect to the CPU 30 using the CPU bus 80, to the AGP 40 using a dedicated AGP bus 90, to the memory 70 using a dedicated memory bus 100 and to all other devices using the PCI bus 110. It will be appreciated that the Northbridge can use other bus topologies to interconnect the various components on the motherboard 20.

The Northbridge chip includes a memory controller (MCT) 200 which controls and directs the flow of data between the memory requestors 210 and the memory 70 over the memory bus 100. The MCT 200 includes a memory request arbiter (MA) 220 and an SDRAM memory controller (SMC) 230. The MCT 200 handles generation, prioritization and management of operations with the memory 70 (as explained below). Co-pending and commonly assigned applications entitled "QUEUE BASED MEMORY CONTROLLER", Ser. No. 09/205,665, filed on Dec. 4, 1998, "METHOD AND APPARATUS FOR OPTIMIZING MEMORY PERFORMANCE WITH OPPORTUNISTIC PRE-CHARGING", Ser. No. 09/205,456, filed on Dec. 4, 1998 and "METHOD AND APPARATUS FOR OPTIMIZING MEMORY PERFORMANCE WITH OPPORTUNISTIC REFRESHING", Ser. No. 09/205,978, filed on Dec. 4, 1998 herein incorporated by reference, further describe operation of the MCT 200 for handling memory requests.

The memory 70 preferably includes several sockets 72 mounted on the motherboard 20 for receiving Dual Inline Memory Modules (DIMM's) 74. In the preferred embodiment, the motherboard 20 includes three sockets 72, each capable of holding one DIMM 74. Alternatively, single inline memory modules or other form of memory carrier can be used. The sockets 72 provide the connections between the DIMM's 74 and the memory bus 100. The memory bus 100 interconnects the memory 70 with the Northbridge 60. Each DIMM 74 includes a printed circuit board with one or more memory chips soldered to each side. In the preferred embodiment, these memory chips include synchronous dynamic random access memory (SDRAM) chips however, other types of DRAM memory chips can be used. Each side of the DIMM 74 is hereinafter referred to as a CS 76. In the preferred embodiment, the memory chips preferably include 64Mb SDRAM chips from Micron Technology, Inc. located in Boise, Id.

SDRAM chips are well known in the art as a derivative form of DRAM type memory. SDRAM chips can run at higher clock speeds than conventional DRAM by synchronizing their operations to the rest of the computer system 10. Further, SDRAM chips also provide a burst access mode which gives the additional advantage of higher access times to the memory 70. In burst access mode, the Northbridge 60 is able to retrieve more data from the memory 70 with each access. This cuts down the number of requests that need to be sent to the memory 70 which saves bandwidth on the memory bus 100. SDRAM chips contain a mode register which can be initialized to the desired burst data size (or burst length). Once the mode register is set, each access to the memory 70 will cause the SDRAM chips to dump the set amount of data. For example, in the preferred embodiment the memory bus 70 is 64 bits (1 quad word) wide. If the burst length is set to 8 quad words (QW) or 64 bytes, the Northbridge 60 can dispatch the address of the first QW and then over the period of the next 8 clock cycles, the memory 70 will send 1 QW per cycle over the memory bus 100 to fulfill the request without further requests from the Northbridge 60.

Physically, the main memory of the computer system is typically divided by each CS 76. Each CS 76 is connected to a Chip Select (CS) signal on the memory bus 100 which is used by the Northbridge 60 to activate only those memory chips. There is a unique CS signal for each CS 76 allowing the Northbridge 60 to address each CS 76 independently. When a CS 76 is accessed, all memory chips that are a part of that CS are accessed simultaneously as though they were a single unit. This allows for interleaved accesses where if one CS 76 is busy servicing a request, the Northbridge 60 can send another request to another CS 76 without waiting for the first request to complete.

To further promote higher memory bandwidth, each CS 76 is typically divided into separate banks which can be independently accessed. This allows for interleaved memory accesses within a particular CS 76. The number of banks is dependent upon the manufacturer of the memory chips used in the DIMM 74. The physical layout of the memory storage circuits in each bank of each memory chip is usually in a grid arrangement (row/column) and the SDRAM provides inputs for a row address and a column address to access into this grid. Therefore, to access any location in the memory 70, the computer system 10 need only choose a particular CS 76, bank, row address and column address. In the preferred embodiment, each DIMM 74 has 2 CS 76 with each CS 76 having up to 4 banks, up to 8,192 (8 K) Rows and up to 2048 (2 K) Columns. The combination of specifying a particular CS 76, bank and row is also referred to herein as a page.

In addition, SDRAM memory chips provide buffer storage called an SDRAM row buffer (row buffer). There is usually one row buffer per bank. Once a page has been selected (also known as an Activate operation), the SDRAM will move the selected row into the bank's row buffer. From the row buffer, the column address is used to select the desired data for read or write operations. When a row is activated into the row buffer, the memory control logic must be sure to cause the row buffer contents to be stored back in the memory array before moving a different row into the row buffer (as discussed below).

For the exemplary Northbridge 60, memory requests to the memory 70 can be classified into three scenarios. These scenarios are also used to identify the primitive operations (pre-charge, activate and read/write) that the MCT 200 must send to the memory 70 in order to initiate the request. The first scenario is called a page hit (PH) when the memory request is directed to a page that is already active in the row buffer of a particular CS 76 and bank. This type of transaction has the lowest latency because only the read/write operation and the appropriate column address need to be dispatched to initiate the memory request. The only delay incurred is the turn around time of the memory 70 to send the appropriate data back or write the data to the row buffer in order to complete the request.

The second scenario is called a page conflict (PC). A PC occurs when the memory request is to a CS 76 and bank that currently has an active page in its row buffer but this request is directed to a different row. This scenario involves the longest latency due the fact that the bank must be pre-charged and then the new page must be activated into the row buffer before the read/write operation can be dispatched to initiate the request. In addition, further delay is introduced if the request that put the current page in the row buffer has not yet completed. Then the request for the new page must be stalled. When a PC occurs, the MCT 200 will need to dispatch a pre-charge, activate and read/write operation to the SDRAM.

The third scenario is called a page miss (PM). A PM occurs when the current request is to a bank that has no currently active page in its SDRAM buffer.

PM's are of two types. The first is a PMc, where the current request is to a CS 76 different from the most recently accessed CS 76. The second is a PMb, where the current request is to the most recently accessed CS 76 but to a different bank than that already active in that CS 76. In a PM, the MCT 200 need only dispatch an activate operation to move the desired page into the row buffer followed by a read/write operation to initiate the request. For a PMc, a pre-charge operation is also sent to the last accessed bank in order to write the active row back to the memory array. Note that by pre-charging in this manner, a PM is guaranteed to be to a bank that is already pre-charged. If the bank were not already pre-charged, it would mean that there was an active row already in the row buffer, making this a PC scenario.

Further, in the exemplary computer system 10, pre-charge, activate and read/write operations require a certain amount of time to complete. Another operation to a particular CS 76 may have to wait to be dispatched until the prior operation has completed. These delays are also referred to as timing dependencies.

FIG. 2 lists the SDRAM timing variables and dependencies that must be adhered to when sending operations to the memory 70. This table shows the timing variable, which operation queue is responsible for meeting this timing requirement, the expected latency, and a description of the requirement. The expected latency values are shown for Column Address Strobe (CAS or Tcl) timing of two cycles and three cycles although other CAS latencies can be used. These timing variables are all based around the access characteristics of the particular SDRAM chips installed in the memory 70 as provided by the manufacturer. For example, the AQ 340 is responsible for waiting for Trp before sending an activate following a pre-charge. Trp is the delay required by the SDRAM chip between pre-charging a bank and then subsequently activating that same bank.

For example, utilizing the exemplary SDRAM from Micron Technology, Inc. a typical pre-charge operation to a CS 76 takes 30 nano seconds (or 3 cycles on a 100 MHz system bus). This delay is also referred to as Trp. This means that the MCT 200 must wait for Trp before sending the subsequent activate operation to the CS 76. Further, once the activate operation is sent, it takes 30 nano seconds (or 3 cycles on a 100 MHz system bus) for the row to be moved into the SDRAM row buffer. This delay is referred to as Trcd. This means that the MCT 200 must wait for Trcd to dispatch the read or write operation. Note that if the next operation following the activate is a pre-charge, the delay before sending the pre-charge is referred to as Tdpl and may be different than Trcd. Further, only one bank of one CS 76 can send or receive data over the memory bus 100 at any given time. Once a bank begins to send or receive data to or from the MCT 200, subsequent read and write operations to any CS 76 (but not activates or pre-charges to other banks) must wait for the data to finish transferring. These operational/timing dependencies only occur on any one CS 76 and/or bank. Requests to more than one CS 76 or to a different bank can be dispatched in a parallel or interleaved fashion.

Figure 3:
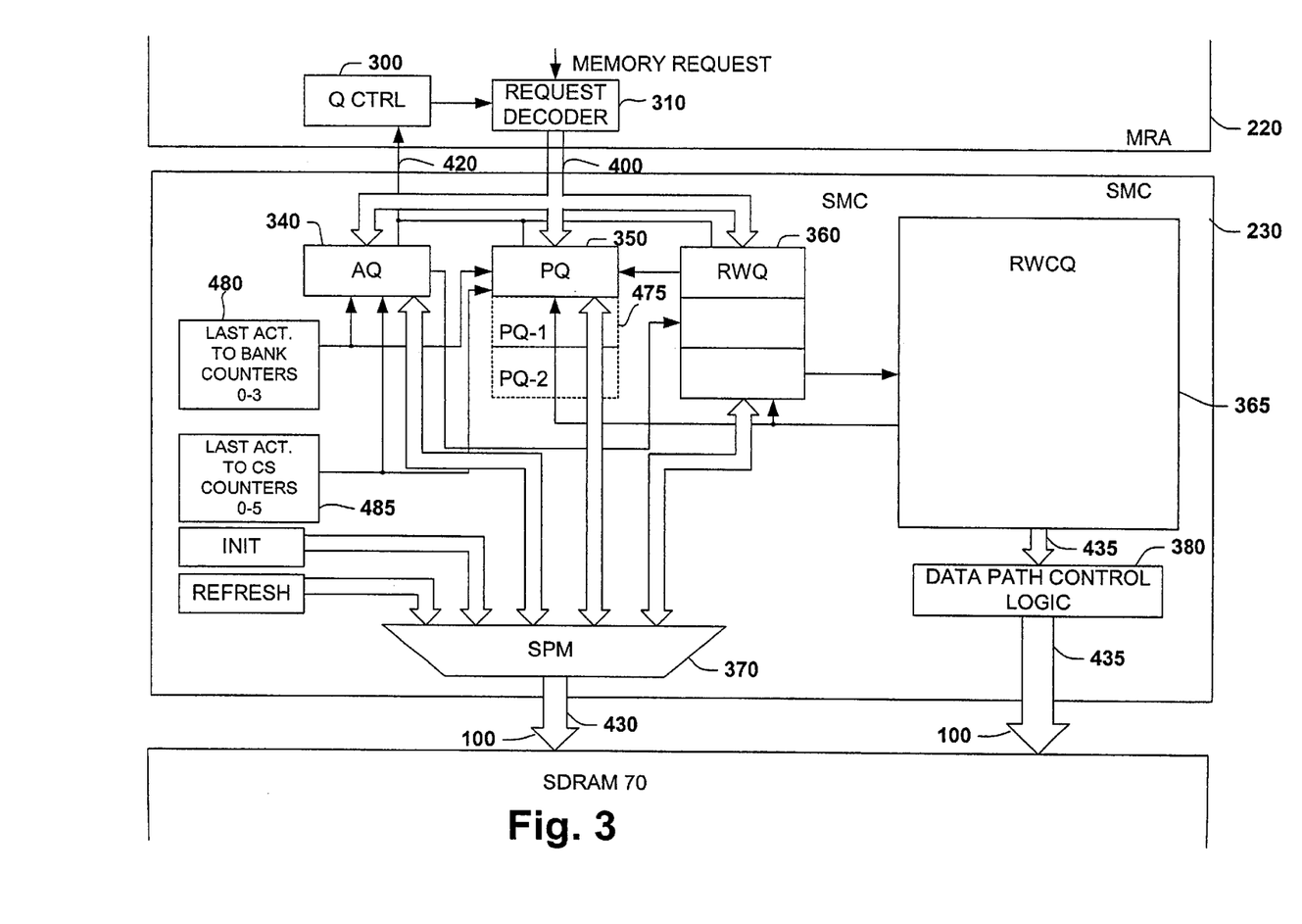
FIG. 3 is a block diagram depicting the MRA and SMC units of the memory controller of FIG. 1.

Referring now to FIG. 3, there is shown a more detailed view of the MRA 220 and SMC 230. The MRA 220 includes queue control logic 300 and a request decoder 310. The SMC 230 includes an activate operation queue (AQ) 340, a pre-charge operation queue (PQ) 350, a read/write operation queue (RWQ) 360, a read/write control queue (RWCQ) 365, an SDRAM priority multiplexor (SPM) 370 and data path control logic 380. The SMC 230 also includes a Next Request input 400 to receive the decoded primitive memory operations constituting the next memory request from the request decoder 310 in the MRA 220. Further, the SMC 230 includes a queue status output 420 to indicate to the MRA 220 whether the AQ 340, PQ 350 or RWQ 360 have available entries. The SMC 230 also has an SDRAM command bus output 430 connected to the memory bus 100 and a data bus control output 435 connected to the data path control logic 380. In the exemplary SMC 230, the AQ 340 and PQ 350 are each a one entry queue and the RWQ 360 is a three entry queue. Note that the PQ 350 also has two additional queue entries 475 which remember the last two issued pre-charge operations in order to resolve timing dependencies among the queues.

The AQ 340 also includes two sets of counters 480, 485 which are used to measure the number of cycles from the last activate operation to a particular bank or CS 76. The first set of counters 480 includes four counters which count the number of cycles from the last activate to each bank of the currently active CS 76. These counters are reset whenever there is access to a new CS 76. The second set of counters 485 includes six counters which count the number of cycles from the last activate to each CS 76. Both sets of counters 480, 485 are used to resolve timing dependencies among the queues.

The memory requestors 210 make various requests on the inputs of the MRA 220 for access to the memory 70. The MRA 220 selects one request to be sent to the SMC 230. The queue control logic 300 is connected to the queue status output 420 from the SMC 230 and determines whether or not a request can be sent to the SMC 230 (discussed below). If a request can be sent to the SMC 230, the request selected by the MRA 220 is passed to the request decoder 310. The request decoder 310 decodes the request into its primitive memory operations and transmits these primitive memory operations to the operation queues 340, 350, 360 in the SMC 230 via the next request input 400. In the exemplary SMC 230, the request decoder 310 is implemented in combinational logic.

Each of the operation queues, the AQ 340, the PQ 350 and the RWQ 360 are connected to the SPM 370. The PQ 350 and RWQ 360 are also connected to the RWCQ 365. Each operation queue 340, 350, 360 operates independently to try and issue its queued operations onto the memory bus 100 in order to initiate the memory request. Further, each operation queue 340, 350, 360 is responsible for strictly adhering to timing and ordering dependencies and can only issue an operation when these dependencies are met. The SPM 370 selects an operation to be sent to the memory 70 and then dispatches it. When more than one queue has resolved its dependencies (if any) and wants to send an operation, the SPM 370 must choose one of them. In the exemplary SMC 230, the SPM 370 implements a priority based selection.

The operation queues 340, 350, 360 are interconnected with each other and the RWCQ 365 in order to track and properly issue operations currently in the operation queues 340, 350, 360 which are timing and order dependent on each other. Once the memory request is initiated, the RWCQ 365 is responsible for tracking the outstanding read or write operations that have been sent to the memory 70 and handling the completion of these requests. If the initiated request is a read operation, the RWCQ 365 must handle the receipt of the data from the memory 70 as it comes across the data bus 100. If the initiated operation is a write request, the RWCQ 365 must handle providing the data to be written to the memory 70. The RWCQ 365 is also connected to the operation queues 340, 350, 360 and provides necessary information about historical operations so that the operation queues can determine when timing and ordering dependencies are met in relation to past operations.

Figure 4:
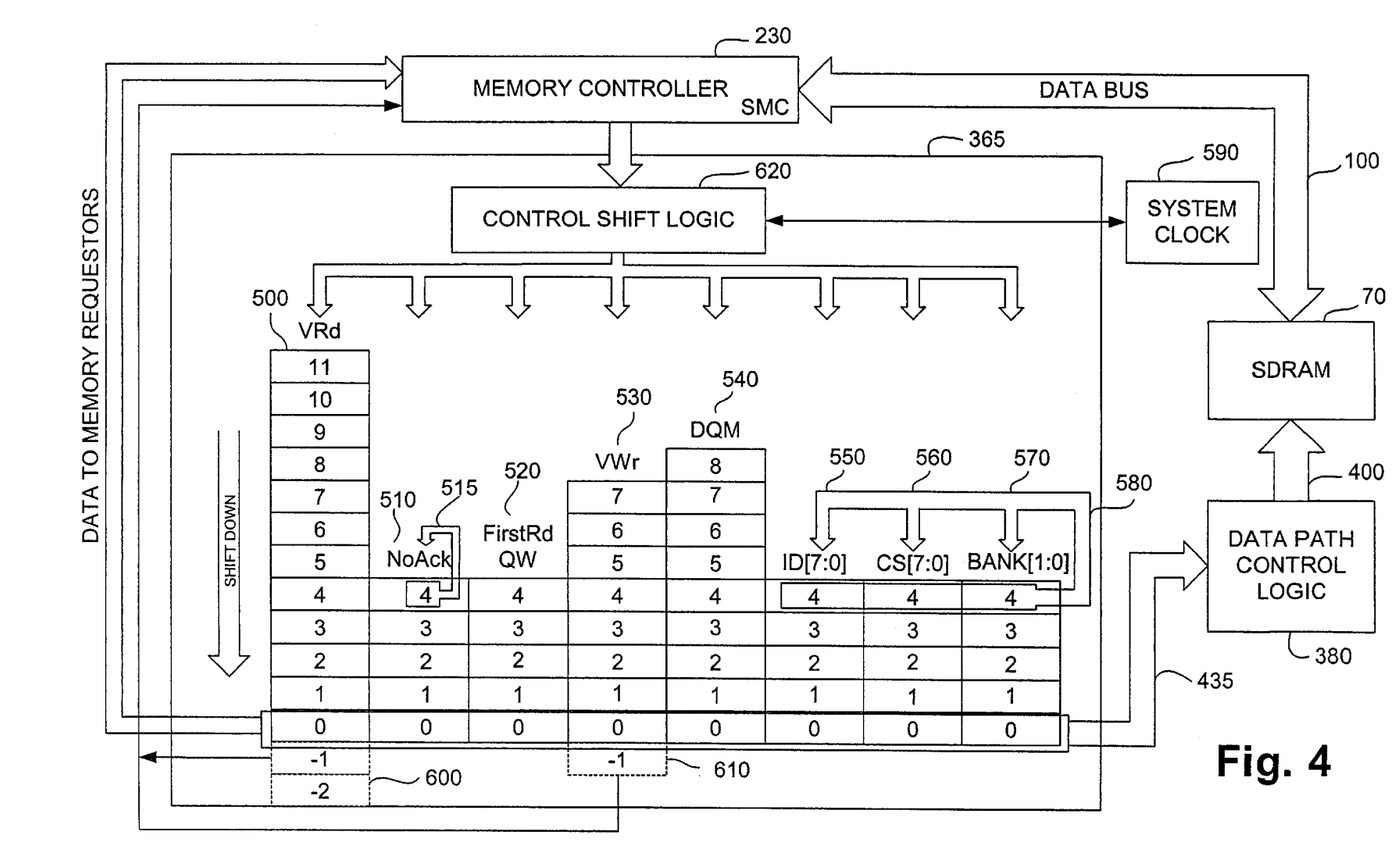
FIG. 4 is a block diagram depicting the preferred read write control queue unit of the SMC of FIG. 3.

Referring now to FIG. 4, there is shown a more detailed diagram of the RWCQ 365. The RWCQ 365 includes a valid read queue (VRd) 500, a no_ack queue 510, a first read quadword queue (FirstRdQW) 520, a valid write queue (VWr) 530, a data query mask queue (DQM) 540, an ID queue 550, a CS queue 560 and a bank queue 570. In the exemplary SMC 230, the VRd 500 is twelve entries deep, the no_ack queue 510 is five entries deep, the FirstRdQW queue 520 is five entries deep, the VWr queue 530 is eight entries deep, and the DQM queue 540 is nine entries deep. While the no_ack queue 510 is only 5 entries deep, it has a repeating mechanism 515 to match the queue depth of the VRd queue 500 (discussed in more detail later). The ID queue 550, CS queue 560 and bank queue 570 are each five entries deep but also have a repeating mechanism 580 to match the queue depth of the VRd queue 500 (discussed in more detail below). Note that alternatively, a single queue could be implemented with fields in each queue entry representing the above data and flags.

The RWCQ 365 further includes control and shift logic 620 which is connected to the RWQ 360 and the system clock 590. The control and shift logic 620 is controlled by the RWQ 360 and loads the queues only when the RWQ 360 sends a read or write request to the memory 70. The control and shift logic 620 loads the queues with the data necessary to complete the read or write once it is initiated and sent to the memory 70 by the RWQ 360. The control and shift logic 620 then controls the shifting of the queues on each clock cycle. Under the control of the control and shift logic 620, the queues all shift at the same time and shift their entries down on each clock cycle with the bottom entry shifting out of the queues. The VRd 500 also provides two additional queue slots 600 to remember the last two dequeued entries and the VWr 530 provides one additional queue slot 610 to remember the last dequeued entry. These entries are provided for use by the operation queues 340, 350, 360 in resolving dependency issues. For example, the PQ 350 must look at the second additional VRd queue slot 600 and the additional VWr queue slot 610 before sending a pre-charge operation so as not to pre-charge the CS 76 or bank which is currently in use.

FIG. 5 lists the different data queues in the RWCQ 365 and explains their contents. The VRd queue 500 holds a valid bit used to tell the data path control logic 380 to expect a quadword of data over the SDRAM bus 100. This queue has twelve entries (labeled 0–11) to account for up to an eight quadword transfer and up to a CAS latency of 4 cycles. When loading this queue for a read operation, the control and shift logic 620 will not load the number of entries at the bottom of the queue corresponding to the set CAS latency for the type of memory installed in the system. In this way, the queue itself accounts for the latency in data arrival from the memory 70.

The VWr 530 queue holds a valid bit used to tell the data path control logic 380 to provide one quadword of data to the SDRAM bus 100. This queue has eight entries (labeled 0–7) to handle up to an eight quadword transfer. There are no extra entries here because once a write operation is initiated, the data can immediately follow with no latency.

The no_ack queue 510 holds data representing whether or not the read or write operation needs to be acknowledged to the memory requestor 210 which originally made this memory request. Typically, when a request is no longer needed, it is terminated by its requestor 210. When it is too late to stop the data transfer, this signal gets set so as to avoid signaling the requestor 210 that the request is complete since the requestor thinks the request was terminated. When the no_ack flag is set, it is set for all quadwords to be transferred, therefore this signal is identical for all quadwords. In this case, only five entries are needed in this queue. The first four entries are used to account for the CAS latency. Accordingly, the control and shift logic 620 will not load the number of bottom entries corresponding to the CAS latency. It will load the remaining entries with the proper no_ack data. The fifth entry has a repeating mechanism 515 which continually shifts its value to the fourth entry without losing its own value. In this way, the no_ack queue 510 simulates that it has one entry for each entry in the VRd queue (or enough entries to hold an eight quadword request plus a four cycle CAS latency).

The FirstRdQW 520 queue holds a flag used for read operations. This flag causes a signal to be returned to the memory requester 210 that made the read request when the first quadword of data arrives from the memory 70. This queue is only five entries (labeled 0–4) deep to account for a CAS latency of up to 4 cycles plus one entry to hold the flag for the first quadword of the request.

The DQM queue 540 holds data representing a mask bit for write data. When a write request is to be completed in the memory 70, it is sometimes only necessary to write selected quadwords of an eight quadword block. For quadwords that are not to be written, the corresponding DQM queue 540 entry is set. This signal tells the memory not to write that particular quadword. The DQM queue is also used for read operations when the memory requestor 210 wants fewer quadwords than the burst length set for the SDRAM. A valid bit in a DQM queue 540 entry indicates that this quadword is desired. If the bit is not set, it means that the quadword should be thrown away. So if the burst length for the SDRAM is set for eight quadwords but the requester only wants the first four quadwords, the first four DQM queue 540 entries will be set for the read operation and the next four will not be set. Note that the DQM bit must precede the quadword it represents by two cycles. Therefore for a CAS latency of four and a burst length of eight, there must be nine entries (labeled 0–8) in the DQM queue 540 to validate all eight quadwords of a data transfer. Also note that if the RWQ 360 subsequently determines that it has a read or write request that can use those quadwords designated to be ignored/not written, it can override the DQM bits for those quadwords. Therefore for a read operation the quadwords designated to be ignored can be instead be accepted and for a write operation, quadwords that were designated not to be written can be written to the memory. This provides a much simpler implementation than state machine logic.

The ID queue 550 holds transaction information used to identify and route the data to or from its memory requestor 210. The CS and Bank queues 560, 570 hold information about the target memory location of the transaction and are used exclusively by the PQ 350 and AQ 340 to resolve operational dependencies. The ID queue 550 holds an internal identifier which identifies to whom the data involved in the request belongs to. This enables the data path control logic 380 to route read data back to the proper requester 210 as well as fetch the proper write data from the proper requester. Should a memory requestor 210 desire to terminate a request, the request can be located in the queues by its ID field. The CS queue 560 and the bank queue 570 hold information about where the data is going to (for a write) or coming from (for a read) in the memory 70. The CS queue 560 holds the target CS and the bank queue 570 holds the target bank within that CS. These queues are five entries deep and have a repeating mechanism 580. This mechanism is similar to the repeating mechanism 515 for the no_ack queue 510. The ID, CS and Bank information will always be identical for all quadwords involved in the request. Therefore, for efficiency, the fifth entry simply shifts its contents to the fourth entry without losing its contents. The bottom four entries are used to account for a CAS latency of up to four cycles. In this way, these queues appear to have one entry for each quadword of an eight quadword transfer plus four entries to account for up to a four cycle delay.

When a read operation is dispatched to the memory 70 by the SPM 370, the control and shift logic 620 loads the VRd 500 and the other queues with control signals for use in the future when the data starts to return. When a write operation is dispatched to the memory 70 by the SPM 370, the control and shift logic 620 loads the VWr 530 and the other queues with control signals for use in the future when the memory 70 is ready to receive the data to be written. The bottom entry of each queue represents the state of the SDRAM bus 100 in the current cycle and the necessary control signals to handle that state. On each cycle, as the VRd 500, VWr 530 and the other queues shift down, the appropriate control signals for the current cycle enter the bottom queue entry and are dispatched to control the appropriate actions in the SMC 230 and data path control logic 380.

A exemplary memory request is an eight quadword read operation where the SDRAM CAS latency is four cycles and the SDRAM burst length is set to eight quadwords. The steps to complete this request are detailed in FIG. 6. Upon dispatch by the SPM 370 of the read operation (Step 800), the shift and control logic 620 computes which entries are needed to complete the request (Step 810). For the given exemplary request, all entries will be used. The shift and control logic 620 then loads the top eight entries of the VRd 500 with the proper control signals for handling each quadword of the read data when it starts to come in from the memory 70 (Step 820). The next four entries (including the bottom or current cycle entry) are not loaded with any data. These last four entries could contain the last four entries of a previous memory request in the process of being completed or contain control signals indicating no activity. The top entry of the no_ack queue a 510 is loaded with a flag indicating that receipt of the eight quadwords should be acknowledged to the requestor 210 as they arrive (Step 820). This entry will self repeat using the repeating mechanism 515 so that this appears to be set for each entry of the VRd queue 500 set to expect data. The top entry of the FirstRdQW queue 520 is set so that the memory requestor is informed when the first quadword of data arrives (Step 820). The VWr queue 530 is not loaded for a read operation. The top eight entries of the DQM queue 540 are loaded with flags indicating that all of the quadwords coming from the memory are desired by the requestor (Step 820). Finally the top entries of the ID, CS and bank queues 550, 560, 570 are loaded with the identifying information identifying the requestor 210 and the location in memory being accessed (Step 820). Note that, except for the DQM queue 540, the bottom four entries of each queue are not loaded so as to account for the CAS latency. The DQM signal must be sent prior to the read signals, therefore only one additional empty queue entry is necessary.

Figure 6:
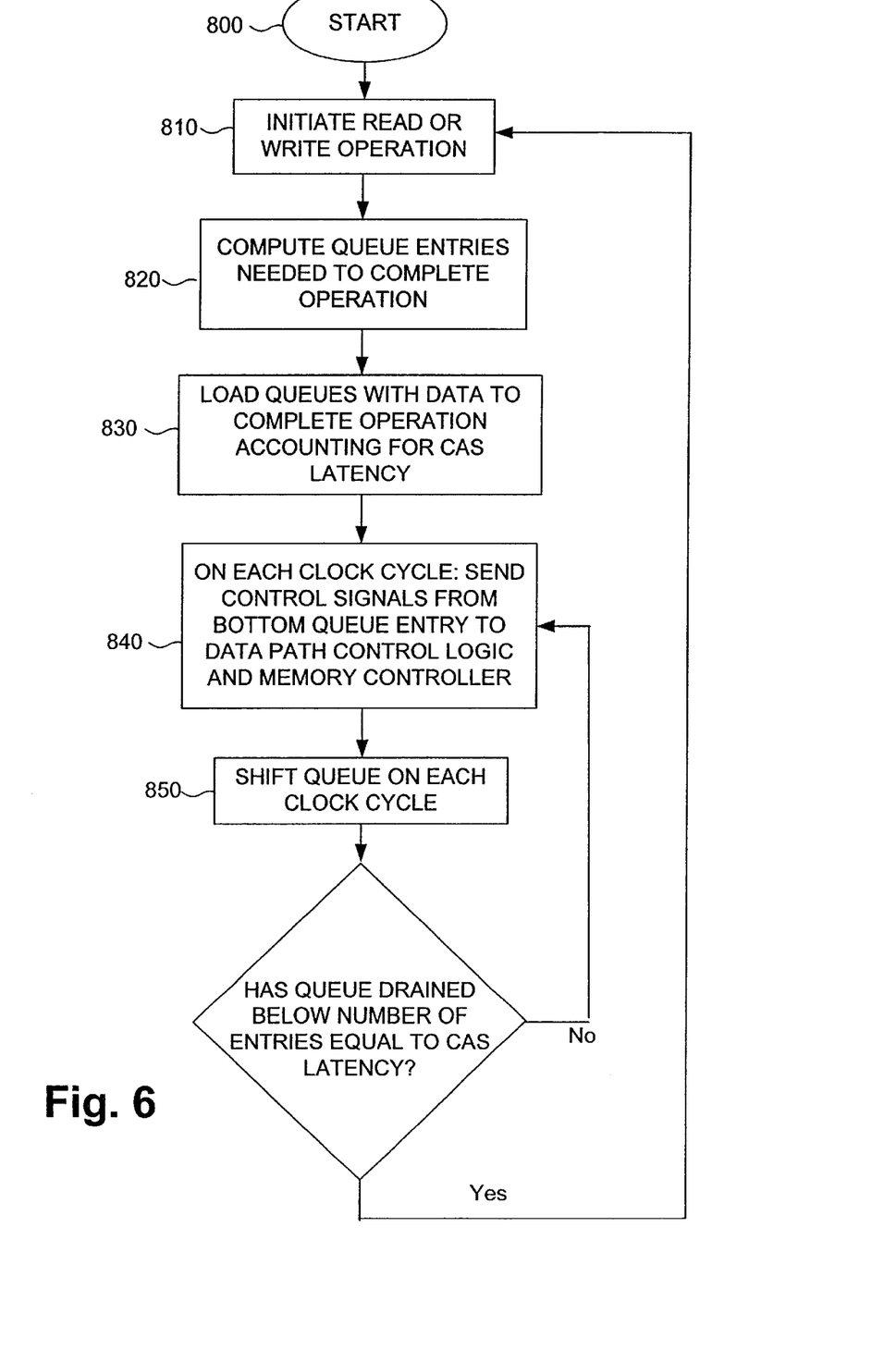
FIG. 6 is a flow chart depicting a preferred method of operation of the read write control queue of FIG. 4.

On each clock cycle thereafter, the entries shift down (Step 840). With a CAS latency of four, it will take four cycles before data starts coming in from the memory following dispatch of the read operation. During these four cycles, the control signals for handling the previous request (if there is one) or indicating no activity are shifted out. After four cycles, the read control signals will have been shifted into the bottom queue entry and be ready for the data as it arrives from the memory 70. On each cycle thereafter, as each quadword comes in, the appropriate control signals will be available (Step 830). In this way, the RWCQ 365 completes the memory request that was initiated by the operation queues 340, 350, 360 with no additional logic required. Note that for a CAS latency of 3, the control and shift logic 620 would load the control signals for the read so as to leave three empty entries in each of the queues, and so on. The RWQ 360 is aware of the length of the request and the CAS latency and knows that once the request has shifted below the number of entries corresponding to the CAS latency, that it can tell the control and shift logic 620 to load another request (Step 850). Depending on the CAS latency, the RWCQ 365 can hold one write operation and up to four read operations in any given cycle.

Figure 7:
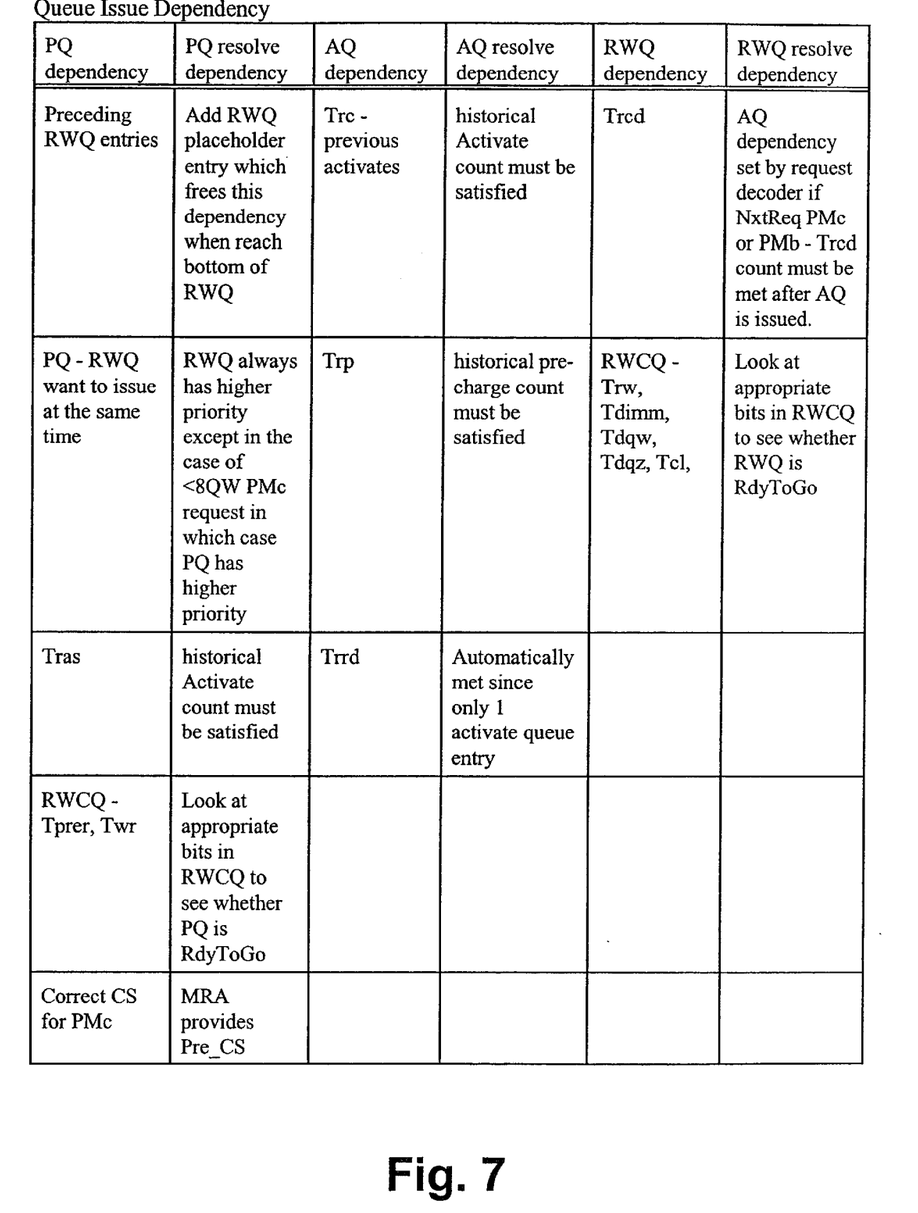
FIG. 7 is a table detailing high level queue dependencies of incoming requests for the preferred queue structure of the SMC unit depicted in FIG. 2.
Figure 9:
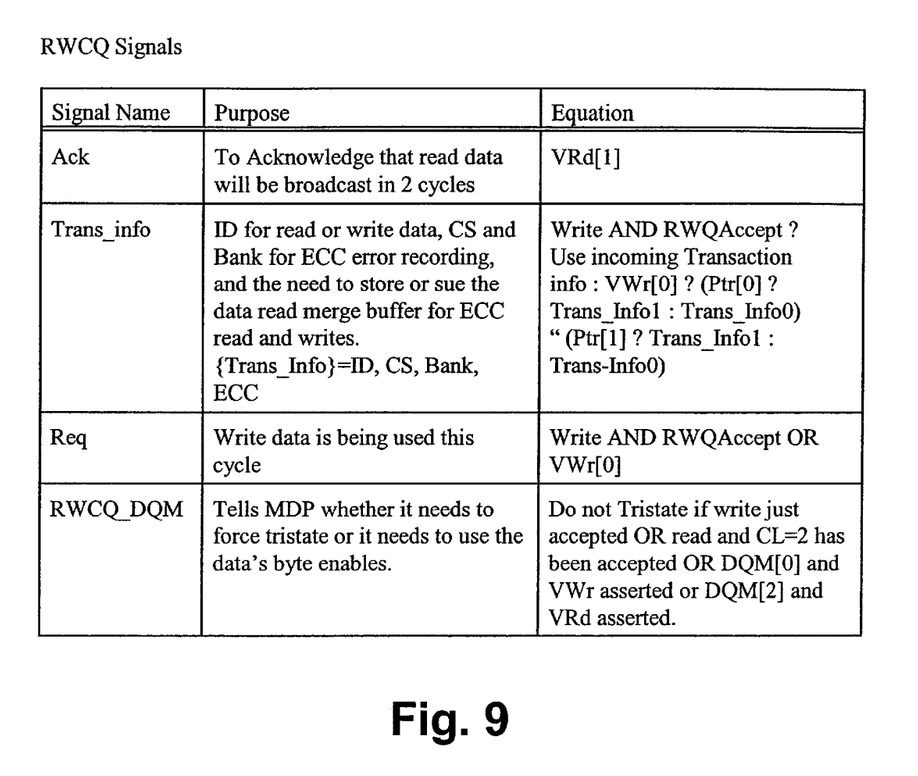
FIG. 9 is a table detailing important signals generated by the preferred read write control queue.

FIG. 7 lists high level ordering dependencies of each operation queue and lists which historical operations that each queue must look for. This table shows the request category (or scenario), PH, PMb, PMc or Pre. For each category, the table indicates whether the request is dependent on historical previously transmitted) pre-charges, activates or read/write operations. FIGS. 8A & 8B show the dependencies of the RWCQ 365. This table shows by request category, when the next request can be sent to the memory and what that next request is dependent on. FIG. 9 shows important RWCQ 365 signals that the RWCQ 365 generates and sends to other units.

Each of the operation queues 340, 350, 360 are operation requestors. Whenever an operation requestor determines that it has an operation whose timing and ordering dependencies have been met, that requester will assert a signal to the SPM 370. This signal tells the SPM 370 that there is an operation ready to be sent. When more than one operation requester is ready to send an operation, the SPM 370 selects the one operation with highest priority. The SPM 370 then sends a signal back the accepted requester to indicate that the operation was accepted and that the requestor can dequeue the operation. Once accepted, the operation is transmitted to the memory 70 over the memory bus 100.

When a read or write operation is dispatched from the RWQ 360, the RWCQ 365 is appropriately loaded to reflect the outstanding operation so that it can be properly completed. As discussed earlier, the RWCQ 365 continually shifts its entries down and out of its queues with the bottom entry holding the appropriate control signals for the current state of the memory bus 100.

In this way, each operation queue is able to resolve timing and ordering dependencies and issue operations independently in order to initiate memory requests. Further, the RWCQ 365 is able to easily complete the memory request by pre-setting control information for future activity and utilizing a simple shifting queue structure to dispatch the appropriate control signals at the right time. This allows for maximum performance through optimal utilization of the memory bus. This also allows for easy operation dependency resolution by the other units of the memory controller which results in better efficiency. Further, the simple queue structure results in a less complicated design which in turn results in a reduction of the gate counts, the design time/cost and the number of design errors while increasing the speed of the logic. In addition, this simple queue structure provides a flexible design capable of working with a variety of memory architectures, including multiprocessor architectures, by simply altering the queue size or queue entry field contents.

It is intended that the foregoing detailed description be regarded as illustrative rather than limiting and that it is understood that the following claims including all equivalents are intended to define the scope of the invention.

We claim:

1. An apparatus for completing memory requests between a memory controller and a computer memory, said apparatus comprising:

a queue controller coupled to said memory controller and operative to detect when said memory controller initiates a memory request to said computer memory and further operative to generate memory control data for completing said memory request;

at least one queue comprising:

at least one top portion coupled to said queue controller and operative to receive said memory control data;

a bottom portion coupled to said computer memory and operative to provide said memory control data to control the transfer of data between said memory controller and said computer memory; and a shift mechanism coupled between said at least one top portion and said bottom portion and operative to shift said memory control data from said at least one top portion to said bottom portion, wherein said at least one queue comprises a queue depth corresponding to the number of timing pulses required to complete said at least one memory request, and wherein said at least one queue comprises a valid read queue, a valid write queue, a no_ack queue, a first read quadword queue, a data quadword mask queue, an ID queue, a chip select queue and a bank queue, and wherein said apparatus is responsive to a system clock, said system clock providing a timing pulse and wherein said at least one top portion shifts said memory control data to said bottom portion in response to said timing pulse.

2. The apparatus of claim 1 wherein said valid read queue has a queue depth of twelve, said valid write queue has a queue depth of eight, said no_ack queue has a queue depth of five, said first read quadword queue has a queue depth of five, said data quadword mask queue has a queue depth of nine, said ID queue has a queue depth of five, said chip select queue has a queue depth of five, and said bank queue has a queue depth of five.

3. A method for completing at least one data transfer between a memory controller and a computer memory using at least one queue comprising a top portion and a bottom portion, said at least one data transfer comprising at least one transmission of at least one unit of data, the method comprising the steps of:

initiating said at least one data transfer in said computer memory;

loading said top portion with control data to control each of said at least one transmission;

controlling said at least one transmission using said control data from said bottom portion; and shifting said control data from said top portion to said bottom portion after each of said transmission, wherein each of said at least one queue comprises a queue depth corresponding to the number of said at least one transmission required to complete said at least one data transfer, and wherein said at least one queue comprises a valid read queue, a valid write queue, a no_ack queue, a first read quadword queue, a data quadword mask queue, an ID queue, a chip select queue and a bank queue.

4. The method of claim 3 wherein said valid read queue has a queue depth of twelve, said valid write queue has a queue depth of eight, said no_ack queue has a queue depth of five, said first read quadword queue has a queue depth of five, said data quadword mask queue has a queue depth of nine, said ID queue has a queue depth of five, said chip select queue has a queue depth of five, and said bank queue has a queue depth of five.

5. A queue based control mechanism for completing at least one memory request initiated by a memory controller to a computer memory over a memory bus, said at least one memory request comprising at least one transfer of at least one unit of data between said computer memory and said memory controller, said control mechanism comprising:

a system clock, said system clock providing timing pulses;

a queue controller coupled to said memory controller and operative to detect when said memory controller initiates said at least one memory request and further operative to generate memory control data to control said at least one transfer corresponding to said initiated at least one memory request;

a top portion comprising at least one entry, said at least one entry operative to hold memory control data for one of said at least one transfer, said top portion coupled to said queue controller and operative to receive said memory control data;

a bottom portion coupled to said memory bus and operative to control said memory bus using said memory control data; and a shifter coupled to said system clock and further coupled between said top portion and said bottom portion and operative to shift said memory control data from said top portion to said bottom portion in response to said timing pulses, wherein said top portion comprises at least one entry for each of the number of said timing pulses required to complete said at least one memory request, and wherein said top portion and said bottom portion comprise a plurality of data fields, said data fields comprising a valid read field, a valid write field, a no_ack field, a first read quadword field, a data quadword mask field, an ID field, a chip select field and a bank field.

6. The invention of claim 5, wherein each of said plurality of data fields comprise at least one entry corresponding to each of the number of said timing pulses required of that field to complete said at least one memory request.

7. The invention of claim 6, wherein said valid read field has a depth of twelve, said valid write field has a depth of eight, said no_ack field has a depth of five, said first read quadword field has a depth of five, said data quadword mask field has a depth of nine, said ID field has a depth of five, said chip select field has a depth of five, and said bank field has a depth of five.

* * * * *

UNITED STATES PATENT AND TRADEMARK OFFICE
CERTIFICATE OF CORRECTION

| | |
|---|---|
| PATENT NO. | : 6,393,531 B1 |
| DATED | : May 21, 2002 |
| INVENTOR(S) | : Stephen T. Novak and John C. Peck, Jr. |

It is certified that error appears in the above-identified patent and that said Letters Patent is hereby corrected as shown below:

<u>Column 5,</u>
Line 17, please replace the word "(MA)" with the word -- (MRA) --.

Signed and Sealed this

First Day of October, 2002

*Attest:*

*Attesting Officer*

JAMES E. ROGAN
*Director of the United States Patent and Trademark Office*